United States Patent

Riogolini

[15] 3,648,943
[45] Mar. 14, 1972

[54] CAMERA
[72] Inventor: Vernerio J. Riogolini, Brooklyn, N.Y.
[73] Assignee: Whitehouse Products, Inc., Brooklyn, N.Y.
[22] Filed: Dec. 16, 1968
[21] Appl. No.: 784,069

Related U.S. Application Data

[62] Division of Ser. No. 458,593, May 25, 1965, Pat. No. 3,416,425.

[52] U.S. Cl. ...................................................242/71.3
[51] Int. Cl. ..............................................G03b 1/10
[58] Field of Search...............242/195, 196, 197, 198, 71, 242/71.1, 71.2, 71.3, 71.4, 71.5, 71.6, 68.3

[56] References Cited

UNITED STATES PATENTS

| | | |
|---|---|---|
| 2,126,299 | 8/1938 | Wittel et al. ...........................242/197 |
| 2,890,635 | 6/1959 | Owens....................................242/71 |
| 3,106,142 | 10/1963 | Peterson................................242/71 |
| 3,138,081 | 6/1964 | Nerwin..................................242/71.2 |

*Primary Examiner*—Stanley N. Gilreath
*Assistant Examiner*—Gregory A. Walters
*Attorney*—John A. Howson

[57] ABSTRACT

A film take-up spool driving member slidable mounted on a shaft in a film winding mechanism in photographic camera in which loading a film cartridge into the camera first slides the member out of the path of the being loaded cartridge and then permits it to be spring driven into engagement with the film take-up spool in the cartridge when the same is fully seated in the camera.

4 Claims, 17 Drawing Figures

PATENTED MAR 14 1972          3,648,943

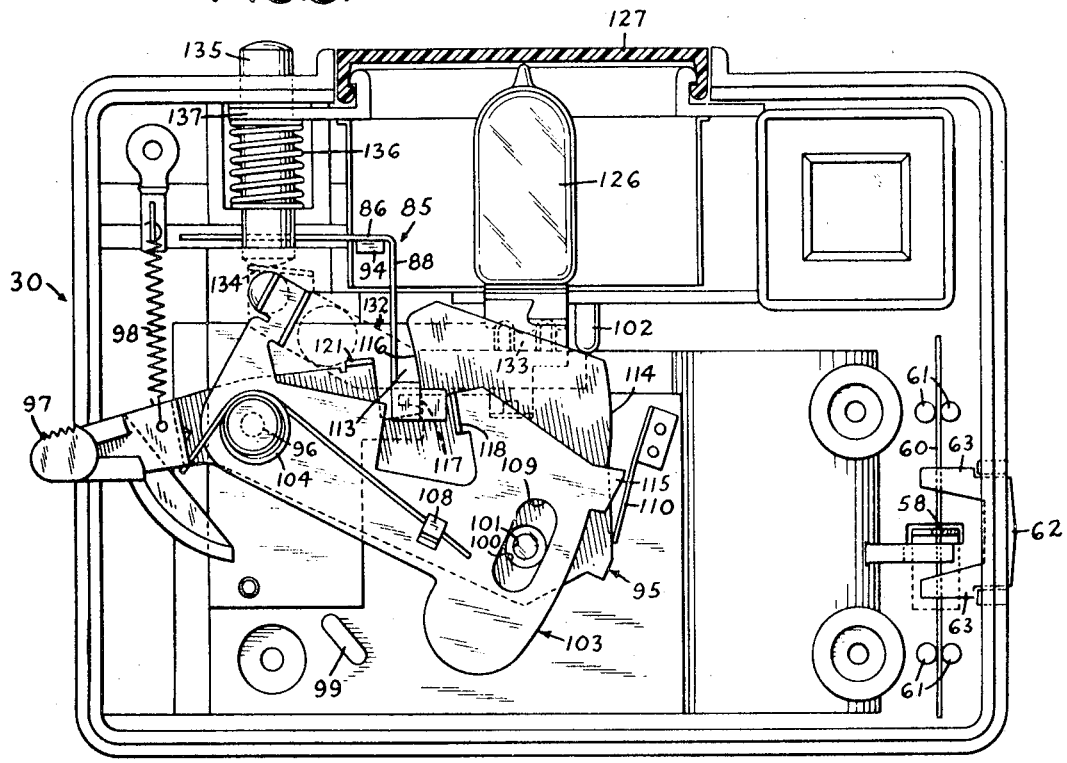

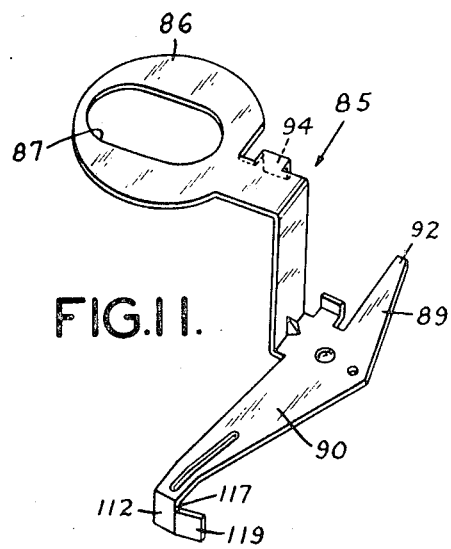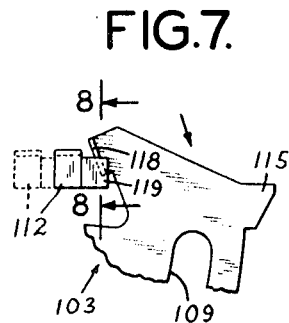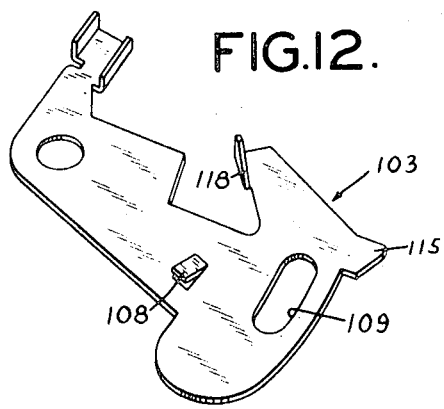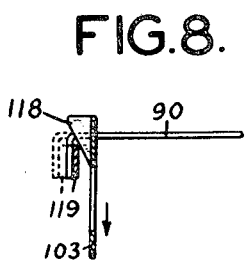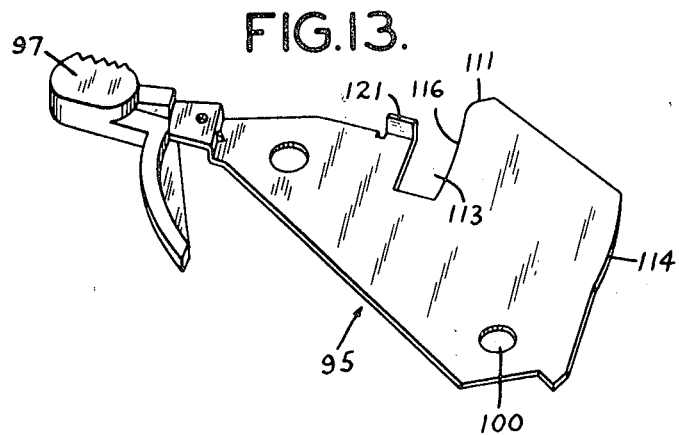

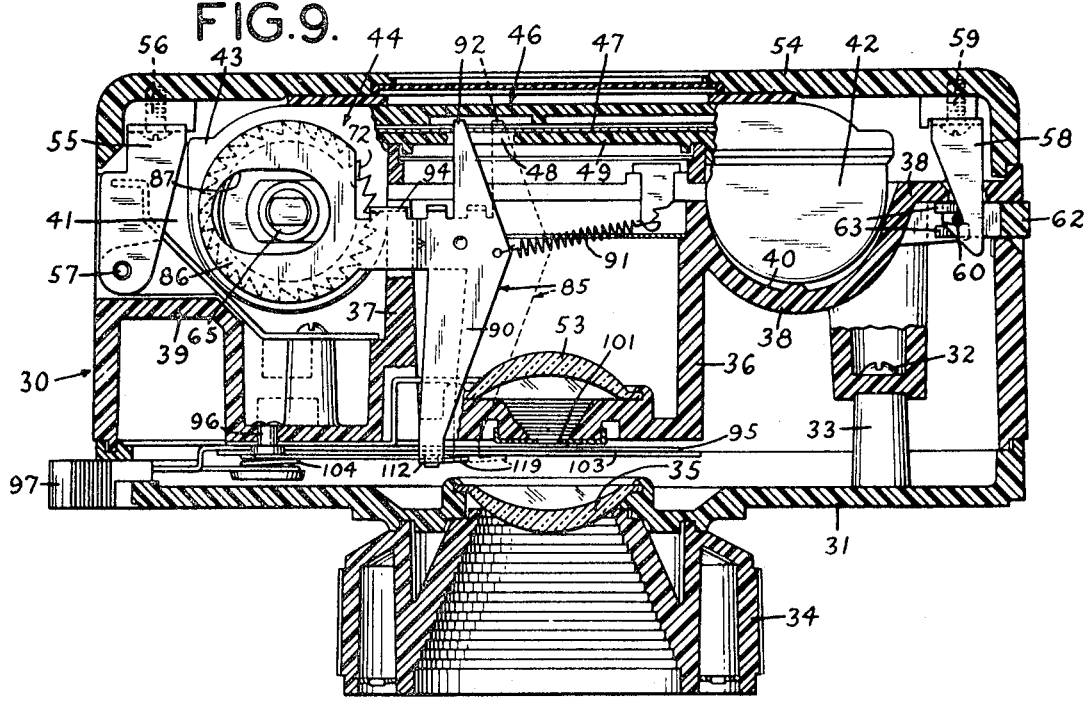
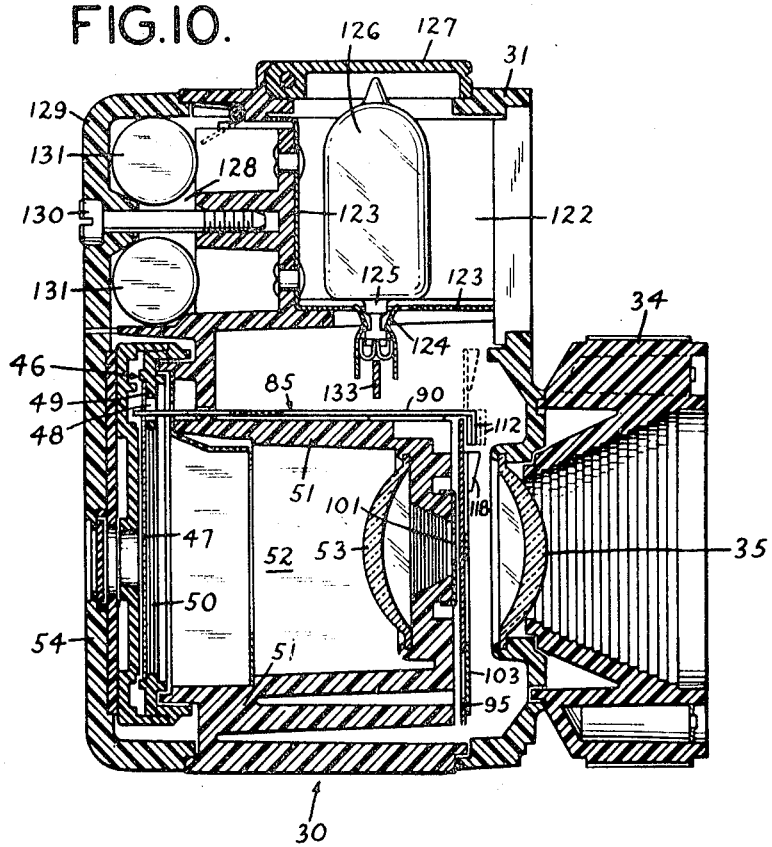

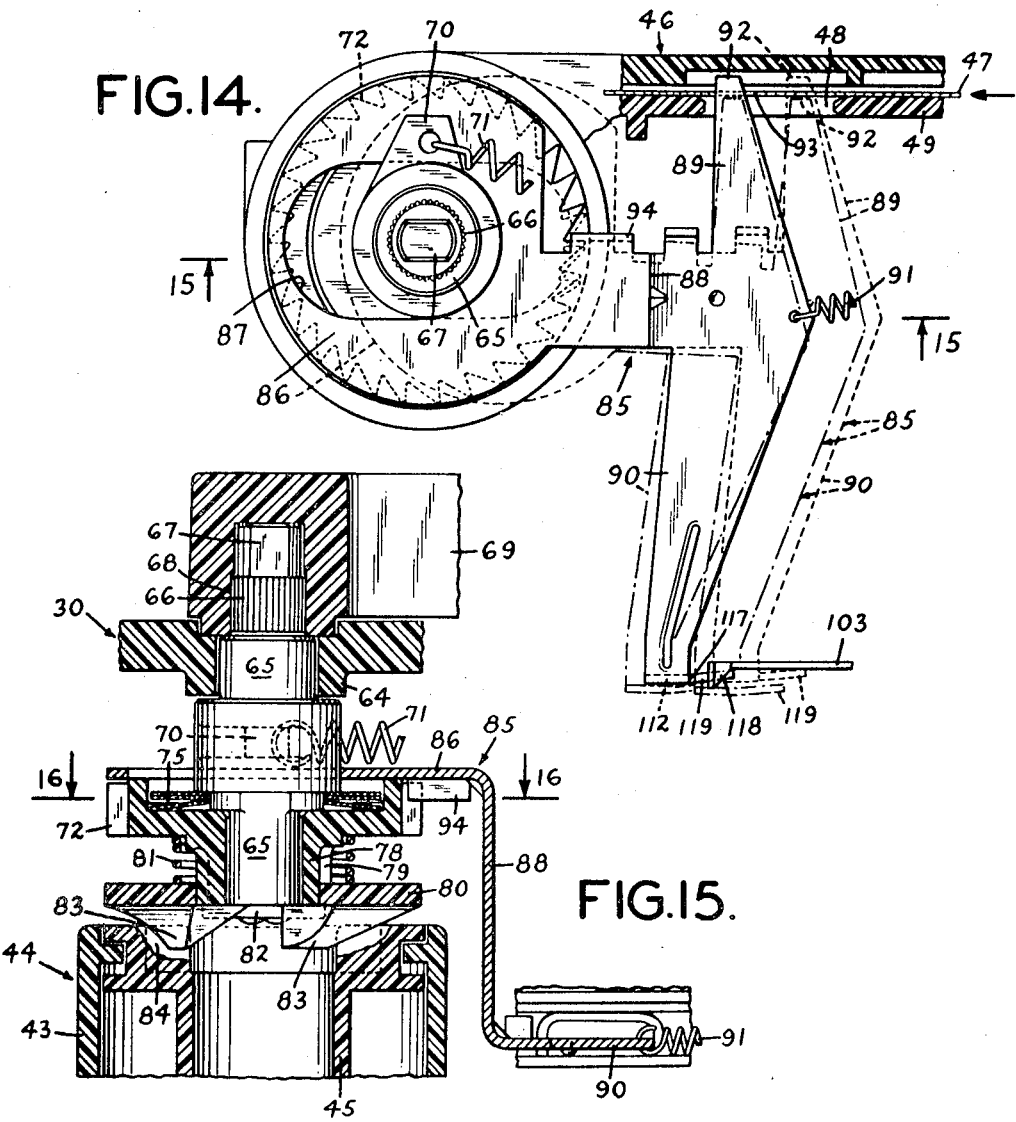
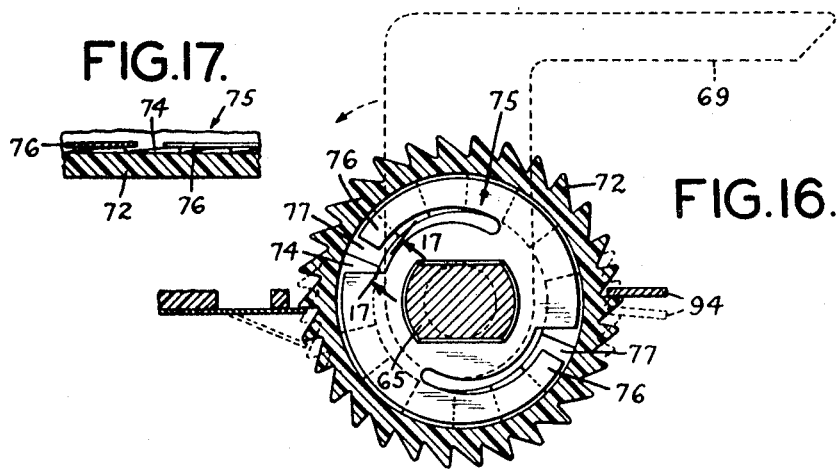

CAMERA

CROSS REFERENCE TO RELATED APPLICATION

This application is a division of my copending application Ser. No. 458,593, filed May 25, 1965, which issued as U.S. Pat. No. 3,416,425 on Dec. 17, 1968.

The present invention relates to cameras, and more particularly to cameras intended to be used with film cartridges or cassettes.

Film cartridges are available on the market today and avoid the loading problems commonly encountered with roll film cameras. An example of such a film cartridge is found in U.S. Design Pat. No. 195,746, issued July 23, 1963, to Hubert Nerwin. A roll film for the cartridge of the Nerwin design patent is illustrated in U.S. Pat. No. 3,086,862 issued Apr. 23, 1963, to Eagle et al. A typical cartridge construction and a typical camera construction for use therewith are illustrated in U.S. Pat. No. 3,138,084, issued June 23, 1964 to D. C. Harvey.

The principal object of this invention has been to provide an improved camera construction especially adapted for use with film cartridges.

Another object of the invention has been to provide such a camera construction which is simple, inexpensive and reliable.

Still another object of the invention has been to provide such a camera for use with a cartridge that is adapted to be enclosed within the housing of the camera.

A further object of the invention has been to provide such a camera in which a film strip is employed having metering perforations along an edge thereof, and in which film metering is accomplished efficiently with a minimum of parts.

In one aspect of the invention, a camera may comprise a central housing member having a front cover rigidly attached thereto and to which at least part of the lens and light-admitting means is attached. A back cover may include a portion that is hinged to the central housing and it may be held closed by a quick release device. The other part of the back cover may be held onto the central housing by screw means, and it may enclose a pocket for the reception of batteries for a flash mechanism.

In another aspect of the invention, the back of the central housing may include spaced, parallel pocket means on each side of the lens, for the reception of a film cartridge having hollow, parallel spaced compartments adapted to fit within the pockets, said compartments being joined by a flat, hollow body through which the film passes as it is unwound from one spool onto the other.

In still another aspect of the invention, a winding device may be provided directly above the pocket containing the cartridge compartment within which the takeup spool is located. The winding device may comprise a shaft journaled in a bearing in the top of the main housing. The lower end of the shaft may have a ratchet with peripheral teeth and an integral collar journaled thereon. The collar has a disk splined to it that is provided with ratchet teeth on its bottom face and is spring-urged away from the other ratchet. The construction is such that with the back cover open, loading a film cartridge into the camera and snapping the back cover closed causes the face ratchet disk to move toward the peripheral ratchet and then to move away from it into engagement with corresponding face teeth on the top of the takeup spool of the film cartridge. An oscillatable crank may be connected to the top of the winding shaft and a spring ratchet toothed arrangement permits unidirectional rotation of the takeup spool upon oscillating the crank, there being a spring to return the crank to its initial position after each forward movement of the crank.

Other and further objects, features and advantages of the invention will become apparent from the following description taken in connection with the appended drawings, in which:

FIG. 5 is a view similar to FIG. 4, showing the shutter mechanism in its position when an exposure is actually made;

FIG. 6 is a view similar to FIG. 4, showing the shutter mechanism after the exposure has been completed but before the shutter returns to its rest position;

FIG. 7 is a fragmentary view of the front shutter, showing the double exposure prevention tab thereon;

FIG. 8 is a view taken substantially along line 8—8 of FIG. 7;

FIG. 9 is a sectional plan view taken substantially along line 9—9 of FIG. 2;

FIG. 10 is a sectional elevational view taken substantially along line 10—10 of FIG. 1;

FIG. 11 is a perspective view of the film metering plate;

FIG. 12 is a perspective view of the front shutter;

FIG. 13 is a perspective view of the rear shutter with the exposure knob attached;

FIG. 14 is an enlarged plan view of the film metering plate showing its operative relationship to the film winding mechanism;

FIG. 15 is a sectional view taken substantially along line 15—15 of FIG. 14;

FIG. 16 is a sectional view taken substantially along line 16—16 of FIG. 15; and FIG. 17 is a sectional view taken substantially along line 17—17 of FIG. 16.

Figure 1:
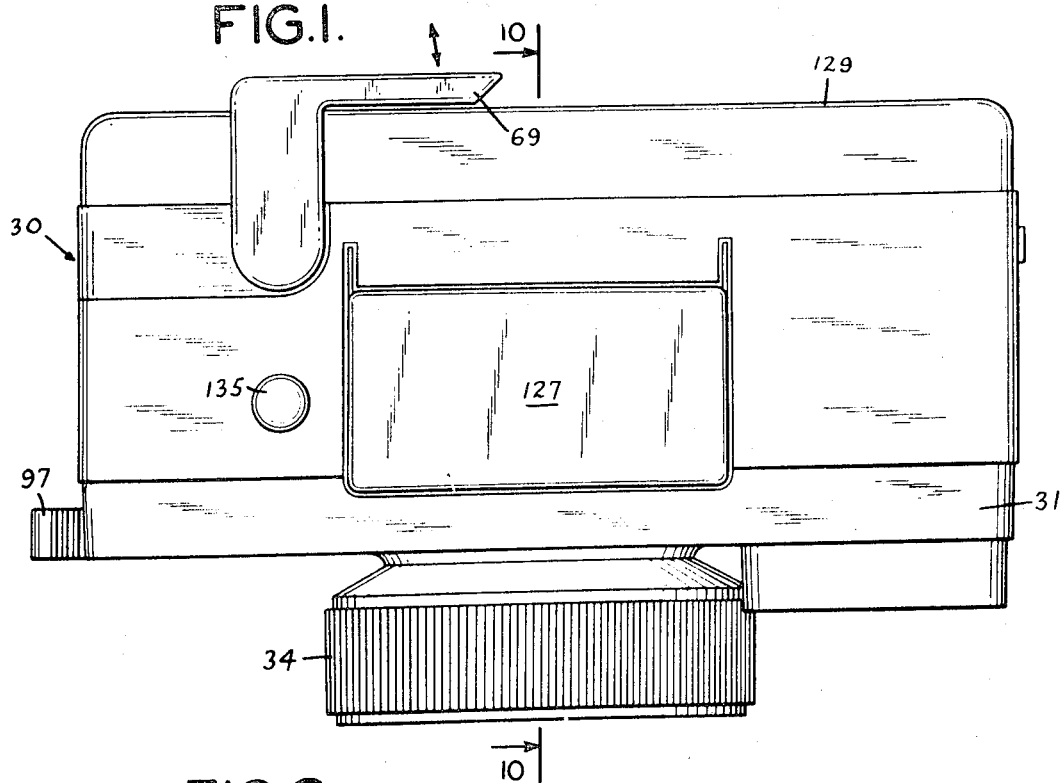
FIG. 1 is a top plan view of a camera to which the principles of the invention have been applied.
Figure 2:
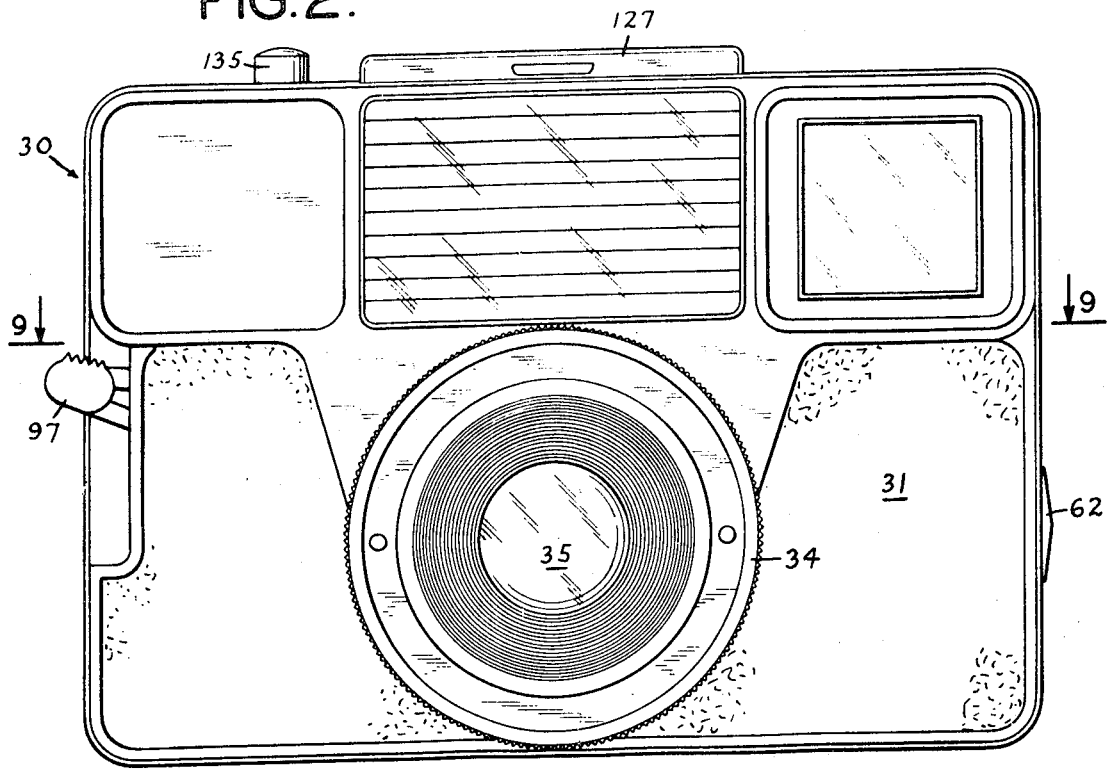
FIG. 2 is a front elevational view of the camera of FIG. 1.

Referring now to the drawings, and particularly to FIGS. 1 to 17, the principles of the invention are shown as applied to a camera including a central body portion 30 to which a front cover 31 is rigidly attached by screws 32 (FIG. 9), only one being shown, threaded into a boss 33 integral with the inside of the front cover 31. Front cover 31 supports a conical, light-admitting member 34 and a lens 35, all as is well known in the art.

The main body 30 may include walls 36, 37, 38 and 39 (FIG. 9) which form various compartments for housing certain elements of the camera mechanism. The walls 37 and 38 provide compartments 40 and 41 which receive the spaced ends 42, 43 of a film cartridge 44. The end 42 contains the unexposed rolled film, and the end 43 contains the takeup spool 45 (FIG. 15). The ends 42, 43 are joined by a flat, hollow portion 46 through which the film 47 is threaded from the unexposed reel to the takeup spool 45, past a film metering opening 48 in a front wall 49 of the flat portion 46 of the cartridge.

Referring to FIG. 10, the front wall 49 of the flat portion 46 of cartridge 44 includes a window 50 that is aligned with a wall 51 of the main body 30, forming a tubular compartment 52, at the forward end of which a lens 53 is mounted that cooperates with lens 35 to form the image on the film 47 when it is framed within window 50.

Figure 4:
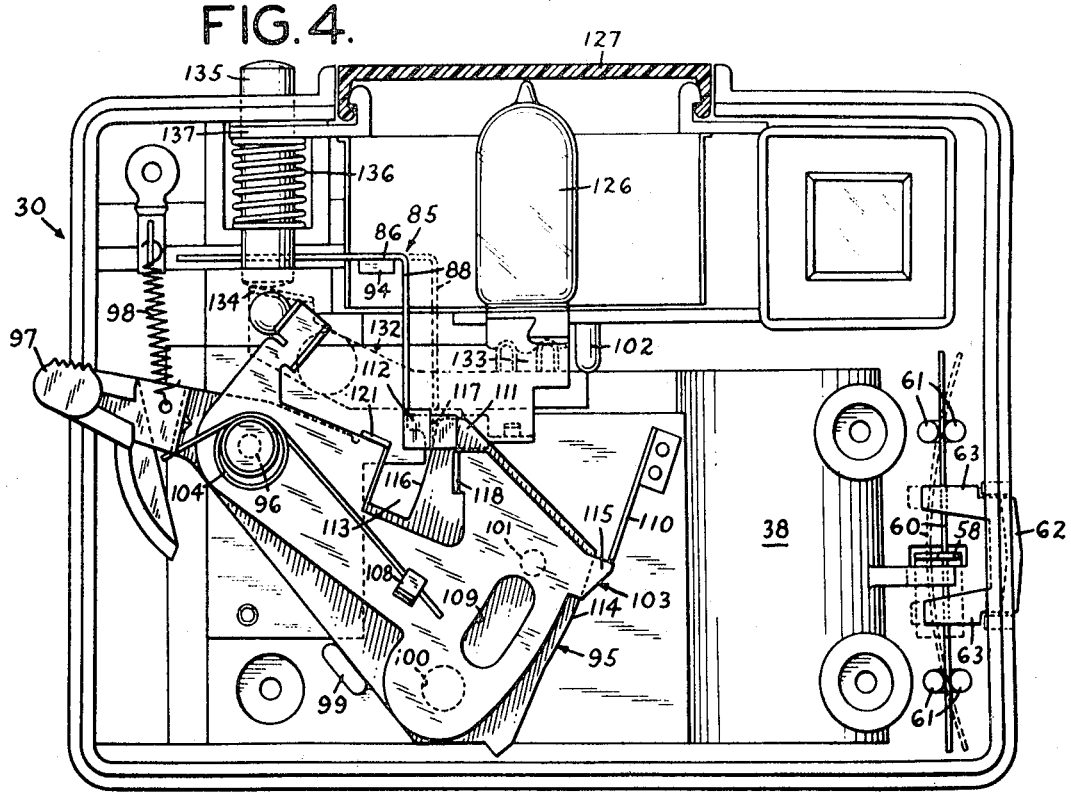
FIG. 4 is a front elevational view of the camera of FIG. 1, with the front cover removed and with the shutter mechanism at rest.

A back cover 54 may have fastened to its inside surface a pair of spaced brackets 55 by means of screws 56 (only one being shown in FIG. 9), the brackets being pivoted on a shaft 57 mounted within the main body 30. The opposite end of the back cover 54 may support a latch 58 that is fixed to the inside of cover 54 by a screw 59. Latch 58 is adapted to cooperate with a resilient rod 60 mounted between four posts 61 (FIG. 4). A pushbutton 62 may extend through the side wall of the main housing 30. It may include legs 63 that engage rod 60 in a manner such that upon depressing button 62, rod 60 is displaced from latch 58, permitting the hinged opening of the back cover 54 so as to replace the cartridge 44 when all of the film therein has been exposed.

Referring to FIG. 15, the top wall of the main housing 30 may include a bearing 64 in which a shaft 65 is journaled. The upper end of shaft 65 is provided with a knurl 66 and a noncircular end 67 that mate with corresponding portions within a socket 68 of a winding lever 69 that is located above the top of main housing 30. Shaft 65 has a lever 70 extending radially therefrom, the outer end of which is connected to one end of a spring 71 and the opposite end of which spring is anchored in the interior of housing 30. The lever 69 is used manually to turn shaft 65 counterclockwise a predetermined distance (FIG. 14), and spring 71 returns the shaft 65 by turning it in a clockwise direction.

The lower end of shaft 65 journals a peripherally toothed ratchet 72. It includes a counterboard portion 73 on the bottom face of which ratchet teeth 74 are formed (FIG. 16). A resilient pawl device 75 may be fixed to shaft 65 and it may include spring teeth 76 that cooperate with face ratchet teeth 74. The arrangement is such that an amount of backlash equal to the space of one of the peripheral teeth of ratchet 72 is provided between teeth 76 and 74 as represented by the spaces 77 (FIG. 16).

The ratchet 72 also includes a collar portion 78 having a spline 79 thereon for receiving a mating spline on a disk 80. A spring 81 between ratchet 72 and disk 80 urges the latter downwardly against an abutment 82 fixed to the lower end of shaft 65. The lower face of disk 80 is provided with face ratchet teeth 83 that are adapted to coact with mating teeth 84 on the upper end of the takeup spool 45. The construction and arrangement of the parts are such that with the back cover open, a film cartridge can be loaded, and as the back cover 54 is closed, the teeth 83 snap into contact with teeth 84 so that upon turning of lever 69 counterclockwise through 90° against the action of spring 71, the cooperation between teeth 76 and 74 causes the turning of takeup spool 45 to draw the film 47 from the loaded spool.

In order properly to frame the film in the window 50 of the cartridge, suitable film metering mechanism is provided. It may comprise a plate 85 including an upper portion 86 that has an elongated slot 87 therein through which shaft 65 extends, thus permitting oscillatable movement about the axis of shaft 65 as well as radical reciprocable movement by virtue of the slot 87. Plate 85 includes a portion 88 at right angles to portion 86 and oppositely extending finger portions 89 and 90 (FIG. 14).

A spring 91 anchored within housing 30 acts to turn plate member 85 in a counterclockwise direction about the axis of shaft 65 and to a position as shown in dot and dash lines (FIG. 14) where the upper end 92 of finger 89 contacts the edge of the film 47. Film 47 is provided with slots 93 spaced along its edge in line with the finger portion 92. Accordingly, as the lever 69 is repeatedly oscillated, the film moves from right to left (FIG. 14) until a slot passes over end 92, whereupon spring 91 causes end 92 to pass into the slot. Continued operation of lever 69 moves film 47, and with it plate 85 through the engagement of end 92 of finger 89 in slot 93.

The upper portion 86 of plate 85 includes a pawl 94 (FIG. 15) which, when plate 85 has been moved an amount properly to frame the next succeeding portion of film 47 in window 50, engages a tooth of the ratchet 72, thereby preventing further action of lever 69 and consequently further movement of film 47.

Figure 3:
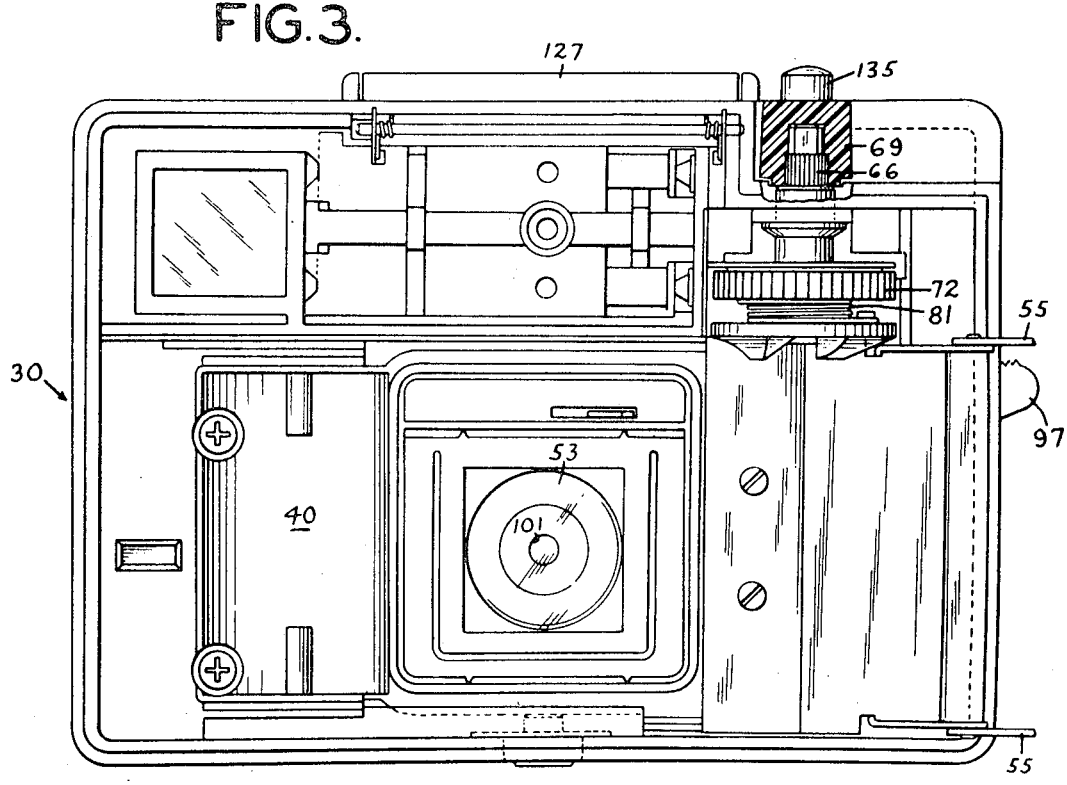
FIG. 3 is a rear elevational view of the camera of FIG. 1, with the rear cover removed.

In connection with the operation of disk 80 which acts as a takeup spool drive member, it should be clear that it slides along spline 79 on collar portion 78 and normally lies adjacent abutment 82 at the bottom of the spline where it has been driven by spring 81. As can be seen in FIGS. 3 and 15 the shape of teeth 83 is such that they protrude downwardly their maximum amount at radially innermost portion of the disk and their minimum amount at radially outermost portion. Their surface these portions is curved to facilitate insertion and removal of cartridge 44 from the camera. Thus as the cartridge is loaded into the camera its end 43 engages the curved surfaces of one or more teeth 83 on disk 80 driving the disk upwardly along spline 79 against the force of spring 81. As soon as the cartridge end passes teeth 83 the spring drives disk 80 downwardly again forcing the teeth into engagement with teeth 84 of the takeup spool 45. The bottom of abutment 82 and shaft 85 at no time interferes with insertion or removal from the camera.

While the invention has been described in connection with specific embodiments thereof and in specific uses, various modifications thereof will occur to those skilled in the art without departing from the spirit and scope of the invention as set forth in the appended claims.

What is claimed is:

1. In a camera adapted to accommodate a film takeup spool and having a housing and a winding mechanism including axially stationary film winding shaft means rotatably journaled in a bearing in an upper portion of the housing, the improvement wherein the shaft means includes a shaft and a ratchet member coaxially mounted about said shaft adjacent its lower end so as to rotate therewith, and the ratchet member includes a plurality of peripheral teeth adjacent its upper end and a splined portion adjacent its lower end, a takeup spool driving member coaxially splined on the splined portion of the ratchet member so as to rotate therewith and be axially slideable therealong, compression spring means surrounding the shaft means for urging the spool driving member into driving engagement with the takeup spool when the spool is accommodated in the camera, an abutment mounted adjacent the lower end of the shaft means for preventing the spool driving member from being pushed off the end of the ratchet member by the spring means when no takeup spool is accommodated in the camera, there being a reciprocable pawl mounted in the housing for cooperation with the ratchet member's peripheral teeth to halt rotation of the member and the spool driving member when the camera is ready to take the next exposure.

2. In a camera adapted to accommodate a film takeup spool and having a housing and a film winding mechanism including axially stationary film winding shaft means rotatably journaled in a bearing in an upper portion of the housing, the improvement comprising: a ratchet member coaxially mounted about the shaft within the housing and having a splined portion adjacent its lower end, a takeup spool driving member matingly splined onto the splined portion of the ratchet member so as to rotate therewith and be axially slideable therealong, and compression spring means mounted about the ratchet member for urging the takeup spool member into driving engagement with the takeup spool when the spool is accommodated in the camera.

3. The combination according to claim 2 wherein the shaft means includes a shaft, the ratchet member is rotatable about the lower end of the shaft, a resilient pawl device for rotating the ratchet and thus the spool driving member with the shaft whenever the shaft is rotated in a predetermined direction but allowing slippage between the shaft and the ratchet member whenever the shaft is rotated in the opposite direction.

4. The combination according to claim 3 wherein the ratchet member has a plurality of peripheral teeth formed above and radially outwardly of its splined portion and there is a reciprocable pawl mounted in the camera housing for engaging said teeth to halt rotation of the shaft, ratchet member and spool driving member whenever sufficient film has been advanced in the camera to frame an unexposed portion for taking the next picture.

\* \* \* \* \*